J. STROMEYER.
POWER TRANSMITTING DEVICE.
APPLICATION FILED FEB. 12, 1912.
1,040,588.
Patented Oct. 8, 1912.
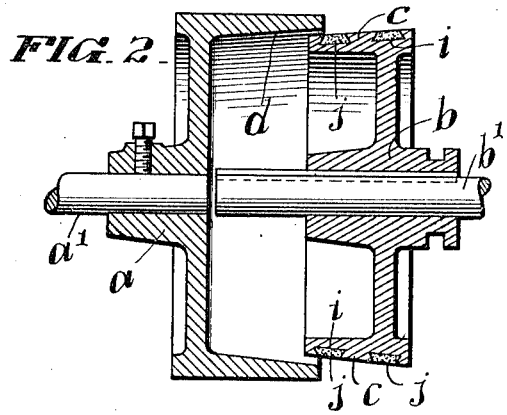
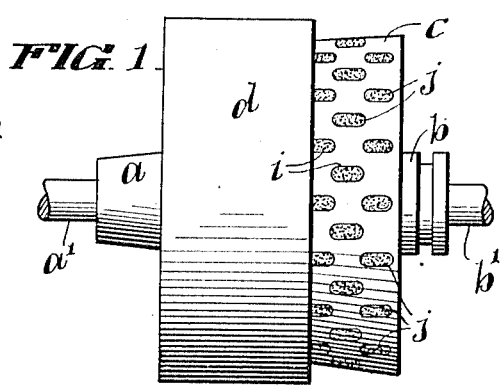
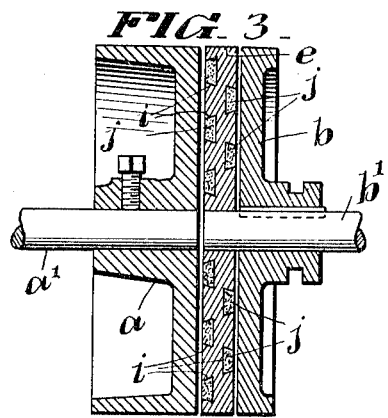
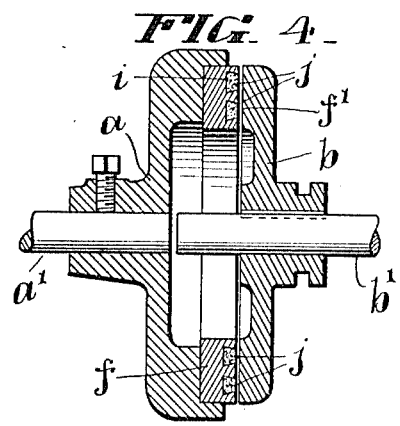
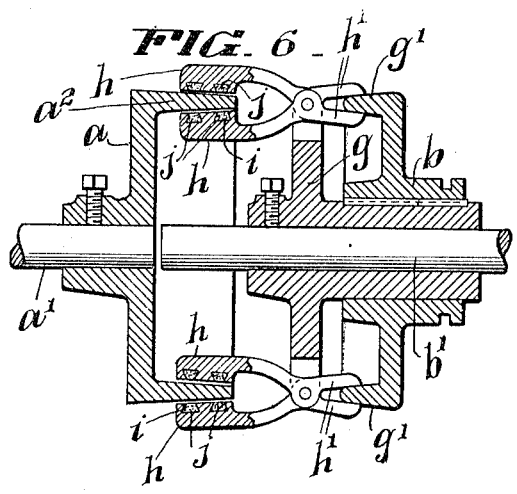
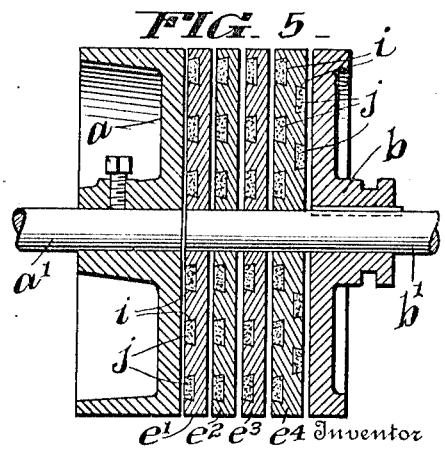
Witnesses
Daniel Webster, Jr.
P. M. Kelly
Inventor
Julius Stromeyer
By
Attorney

UNITED STATES PATENT OFFICE.

JULIUS STROMEYER, OF PHILADELPHIA, PENNSYLVANIA.

POWER-TRANSMITTING DEVICE.

1,040,588.  Specification of Letters Patent.  Patented Oct. 8, 1912.

Application filed February 12, 1912. Serial No. 677,207.

*To all whom it may concern:*

Be it known that I, JULIUS STROMEYER, a citizen of the United States, and a resident of the city and county of Philadelphia, State of Pennsylvania, have invented an Improvement in Power-Transmitting Devices, of which the following is a specification.

More particularly this invention relates to devices for transmitting power from one movable part to another through frictional connection, as in a friction clutch, and the objects are, to so increase the friction between the contacting surfaces that the parts may be brought into driving connection, without slippage, with less pressure than would otherwise be possible, and to reduce the wear on the contacting surfaces.

The invention is not restricted to any particular form of power transmitting devices provided such devices embrace two movable members adapted to be brought into frictional relation with one another, either by direct contact, or through interposed parts or members. The frictional resistance is increased by means of gritty material arranged to act upon the contacting surfaces when the parts are brought into frictional contact, and preferably disposed in pockets distributed over the contacting surface or surfaces.

In the drawings: Figure 1 is a side elevation of a clutch embodying the invention; Fig. 2 is a longitudinal vertical section of the same; and Figs. 3, 4, 5 and 6 are longitudinal vertical sections of other forms of clutches also embodying the invention.

In each of the forms shown there are two rotary members $a$ and $b$ carried respectively by shafts $a'$ and $b'$, and so arranged that they may be brought into frictional relation, either by direct contact, or through interposed parts or members, when one of the members is shifted. As shown the member $a$ is fast on its shaft $a'$, and the member $b$ may be shifted on its shaft $b'$.

In Figs. 1 and 2 I have shown a clutch of the cone type, in which the beveled flange $c$ of the movable member $b$ fits within a cone-shaped flange $d$ of the fast member $a$.

In Fig. 3 the two members $a$ and $b$ have flat faces which are brought into frictional contact with the opposite faces of an interposed loose disk $e$, when the movable part $b$ is operated. A similar construction is shown in Fig. 5, except that in this form a plurality of disks $e$, $e^2$, $e^3$, $e^4$ are interposed between the members $a$ and $b$.

In the form shown in Fig. 4 the member $a$ is provided with a ring $f$, with which the annular face $f'$ of the member $b$ makes contact.

In the construction shown in Fig. 6 the movable member $b$ is mounted on a housing $g$ fast on the shaft $b'$ and is provided with a flange or projecting part or parts $g'$ arranged to act on the rear ends $h'$ of the jaws $h$ pivoted upon the housing and arranged to grip the flange $a^2$ of the member $a$. When the member $b$ is moved forward on the key way in the collar of the housing $g$ the flange or parts $g'$ are thrust between the rear ends $h'$ of the jaws $h$, and the front ends of the jaws are clamped upon the flange $a^2$.

Between the contacting faces, whether of the parts $a$ and $b$, or of parts interposed between them, is placed a hardened gritty material $j$, adapted when the surfaces are brought in contact with one another, to increase the friction, and thus bring the parts into driving connection, with less pressure than would otherwise be necessary, and reduce the possibility of slippage. This gritty material is preferably placed in pockets $i$ disposed over the contacting surface or surfaces. In the form of clutch shown in Fig. 1, these pockets and their gritty fillings are placed in the beveled flange $c$ of the movable part $b$; in the form shown in Figs. 3 and 5, they are in the interposed disks; in Fig. 4 they are in the face of the ring $f$ carried by the fixed member $a$; and in Fig. 6 they are in the clamping faces of the jaws $h$.

It is essential to my invention that the gritty material shall contain a pulverulent substance adapted to spread uniformly to form a thin frictional film or coating between the contacting surfaces. Such film or coating while increasing the friction prevents actual contact and greatly reduces the wear. It is also essential that the pulverulent material which forms the film shall not be affected by such heat as results from the friction nor by moisture. Cork and material of similar character are useless for the purpose, because they are not pulverulent and cannot form a thin film or coating, and also because they are combustible at the heat generated by the friction.

The most satisfactory pulverulent material that I have found for producing the film or coating is magnesite. I prefer to use this in the form of a composition mixed with a refractory material, such as sand, and a binder, such as chlorid of magnesia. This composition is inserted in the pockets $i$ in a plastic condition and hardened. The upper surface should be level with the surface of the part in which it is contained and not projecting above the surface, as the object is not to create friction by the contact of the exposed faces of the portions of gritty material, but to supply from them the necessary material to form the film which is spread evenly between the surfaces of the contacting parts. The pockets thus act as reservoirs to supply the pulverulent material which forms the frictional film.

It is to be understood that I do not mean to limit my invention to the particular forms of clutch parts shown in the drawings, as my invention may be applied to any form of power transmitting devices in which the driving connection is established by friction contact between the surfaces of moving parts.

What I claim is as follows:

1. In a power transmitting device, the combination of a moving driving part and a movable part adapted to be driven by frictional contact with the driving part, the contacting surfaces of said parts being provided with pockets filled with hardened plastic gritty material containing magnesite or an equivalent pulverulent producing a frictional film spread uniformly between the contacting surfaces.

2. In a power transmitting device, the combination of a driving shaft and a driven shaft, a member on one of said shafts and a movable member on the other shaft, said members being adapted to be brought into frictional relation with one another, and the contacting surfaces being provided with pockets filled with hardened plastic gritty material containing magnesite or an equivalent pulverulent producing a frictional film spread uniformly between the contacting surfaces on said members.

3. In a power transmitting device, the combination of two rotary members adapted to be brought into frictional relation with one another, having the contacting surface or surfaces provided with pockets filled with hardened plastic gritty material containing magnesite or an equivalent pulverulent producing a frictional film spread uniformly between the contacting surfaces on said members.

4. In a power transmitting device, the combination of two rotary members adapted to be brought into frictional relation with one another, and a plurality of small pieces of gritty material disposed between the contacting surface or surfaces, and containing magnesite or an equivalent pulverulent, producing a frictional film spread uniformly between the contacting surfaces.

5. In a power transmitting device, the combination of a shaft, a member fast on said shaft, a rotary member movable to or from the fast member, frictional surfaces between said members provided with a filling of hardened plastic gritty material containing magnesite or an equivalent pulverulent, producing a frictional film spread evenly between the contacting surfaces when the movable member is shifted to make a driving connection.

In testimony of which invention, I hereunto set my hand.

J. STROMEYER.

Witnesses:
ERNEST HOWARD HUNTER,
R. M. KELLY.

---

Copies of this patent may be obtained for five cents each, by addressing the "Commissioner of Patents, Washington, D. C."